US012571342B2

(12) United States Patent
Lokasaari et al.

(10) Patent No.: US 12,571,342 B2
(45) Date of Patent: Mar. 10, 2026

(54) ENGINE-GENERATOR SET

(71) Applicant: WÄRTSILÄ FINLAND OY, Vaasa (FI)

(72) Inventors: Tero Lokasaari, Vaasa (FI); Antti Ouni, Vaasa (FI); Juha Ojalammi, Vaasa (FI)

(73) Assignee: WÄRTSILÄ FINLAND OY, Vaasa (FI)

( * ) Notice: Subject to any disclaimer, the term of this patent is extended or adjusted under 35 U.S.C. 154(b) by 708 days.

(21) Appl. No.: 17/720,629

(22) Filed: Apr. 14, 2022

(65) Prior Publication Data

US 2022/0235697 A1      Jul. 28, 2022

Related U.S. Application Data

(63) Continuation of application No. PCT/FI2019/050735, filed on Oct. 15, 2019.

(51) Int. Cl.
| | |
|---|---|
| *F02B 63/04* | (2006.01) |
| *F16F 15/14* | (2006.01) |
| *H02K 5/24* | (2006.01) |

(52) U.S. Cl.
CPC .......... *F02B 63/044* (2013.01); *F02B 63/042* (2013.01); *F16F 15/1485* (2013.01); *H02K 5/24* (2013.01); *F02B 2063/045* (2013.01)

(58) Field of Classification Search
CPC ................. F02B 63/044; F02B 63/042; F02B 2063/045; F16F 15/1485; H02K 5/24
USPC ....... 248/638, 678, 672, 665, 666, 667, 669, 248/651, 637, 634, 632, 622, 621, 618, 248/613, 605, 600, 594, 575, 576, 571, 248/562, 559
See application file for complete search history.

(56) References Cited

U.S. PATENT DOCUMENTS

| | | | | |
|---|---|---|---|---|
| 4,896,830 | A | * | 1/1990 | Takamatsu ............. B60H 1/025 123/41.31 |
| 5,881,990 | A | * | 3/1999 | Kawamura ............. F02B 63/04 280/30 |
| 5,965,949 | A | * | 10/1999 | Fukuda ................... F02B 63/04 322/1 |
| 10,215,327 | B2 | | 2/2019 | Goleczka et al. |

(Continued)

FOREIGN PATENT DOCUMENTS

| | | |
|---|---|---|
| EP | 0931918 A2 | 7/1999 |
| EP | 2671791 A1 | 12/2013 |

OTHER PUBLICATIONS

International Search Report (PCT/ISA/210) mailed on Jun. 30, 2020, by the European Patent Office as the International Searching Authority for International Application No. PCT/FI2019/050735.

*Primary Examiner* — Alfred J Wujciak
(74) *Attorney, Agent, or Firm* — Buchanan Ingersoll & Rooney P.C

(57) ABSTRACT

A engine-generator set includes a generator for producing electricity and an engine that is coupled via flexible coupling to a shaft of the generator for driving the generator, the engine being supported against a support surface by a plurality of resilient mounting elements, and the generator being supported against a support surface by a plurality of resilient mounting elements separately from the engine, wherein the engine is mechanically connected to the generator solely via the flexible coupling.

19 Claims, 2 Drawing Sheets

(56)         References Cited

U.S. PATENT DOCUMENTS

| | | | | |
|---|---|---|---|---|
| 2001/0008343 | A1* | 7/2001 | Herdin ................. | F16F 3/0876 |
| | | | | 290/1 A |
| 2001/0029908 | A1* | 10/2001 | Suzuki ................... | F02B 63/04 |
| | | | | 123/41.31 |
| 2009/0321607 | A1* | 12/2009 | Baron ................... | F16F 15/022 |
| | | | | 248/560 |
| 2010/0294585 | A1 | 11/2010 | Wolff et al. | |
| 2012/0184380 | A1 | 7/2012 | Wolff et al. | |
| 2013/0283598 | A1 | 10/2013 | Bowdich et al. | |
| 2015/0144763 | A1* | 5/2015 | Aeffner ................ | B63H 21/305 |
| | | | | 248/562 |
| 2017/0254468 | A1 | 9/2017 | Goleczka et al. | |
| 2018/0145559 | A1 | 5/2018 | Johnson et al. | |
| 2019/0252946 | A1 | 8/2019 | Johnson et al. | |

* cited by examiner

ENGINE-GENERATOR SET

RELATED APPLICATION

This application claims priority as a continuation application under 35 U.S.C. § 120 to PCT/FI2019/050735 filed as an International Application on Oct. 15, 2019 designating the U.S., the entire content of which is hereby incorporated by reference in its entirety.

FIELD

The present disclosure relates to an engine-generator set

BACKGROUND INFORMATION

Large internal combustion engines, such as ship or power plant engines, are often arranged on base frames, which are supported against a floor of a power plant or an engine room of a ship. A base frame can be made of steel or reinforced concrete. Resilient mounts are often used between the base frame and a supporting surface, such as the hull of a ship or a floor of a power plant. If an engine is coupled to a generator for generating electricity at a power plant, for a propulsion system of a ship, or for another electric system of a ship, the engine and the generator are often arranged on a common base frame.

Common base frames or rigidly connected separate base frames of engine-generator sets can experience vibrations of the engine that are transmitted to the generator causing fatigue failures. Fatigue failures can be concentrated around the areas of mounting points of the generators, but they can occur also in many other locations.

SUMMARY

An engine-generator set is disclosed comprising: a generator for producing electricity; and an engine that is coupled via a flexible coupling to a shaft of the generator for driving the generator, wherein the engine is supported against a support surface by a plurality of resilient mounting elements, and the generator is supported against a support surface by a plurality of resilient mounting elements separately from the engine, wherein the engine is mechanically connected to the generator solely via the flexible coupling.

BRIEF DESCRIPTION OF THE DRAWINGS

Exemplary embodiments of the invention are described below in more detail with reference to the accompanying drawings, in which.

DETAILED DESCRIPTION

Figure 1:
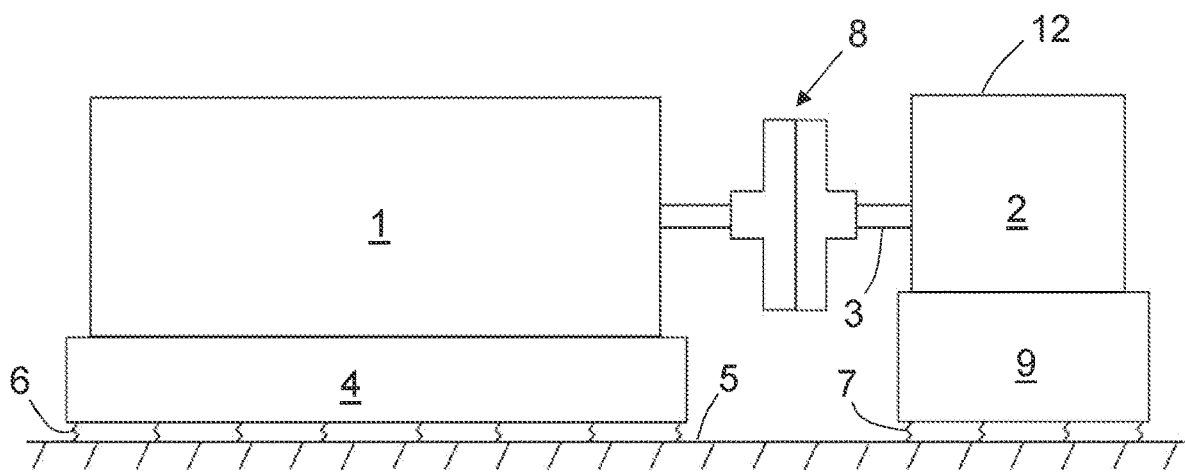
FIG. 1 shows an engine-generator set according to a first exemplary embodiment of the invention.

An improved engine-generator set as disclosed can include a generator for producing electricity and an engine that is coupled via a flexible coupling to a shaft of the generator for driving the generator.

In an exemplary engine-generator set according to the present disclosure, the engine is supported against a support surface by means of, for example, a plurality of resilient mounting elements, and the generator is supported against a support surface by means of a plurality of resilient mounting elements separately from the engine, wherein the engine is mechanically connected to the generator solely via the flexible coupling and.

In an exemplary engine-generator set according to the present disclosure, transmission of vibrations from the engine to the generator is effectively prevented, because there is no rigid connection between the engine and the generator. The arrangement also allows arranging of an inertia mass element between the engine and the generator. Also a clutch for decoupling the generator from the engine can be arranged between the engine and the generator, which allows the use of the generator as a synchronous condenser. Exemplary embodiments also allow the use of lighter foundations, as the foundations can be configured and designed based on the static load of the engine-generator set instead of the dynamic load. The engine and the generator can be supported via the resilient mounting elements against the support surface either directly or indirectly.

According to an exemplary embodiment, the engine is arranged on a base frame and the resilient mounting elements of the engine are arranged between the base frame and the support surface. Alternatively, the engine can be supported directly via the resilient mounting elements against the support surface.

According to an exemplary embodiment, the generator is arranged on a base frame that is separate from a possible base frame of the engine, and the resilient mounting elements of the generator are arranged between the base frame and the support surface. Alternatively, the generator can be supported directly via the resilient mounting elements against the support surface.

According to an exemplary embodiment, the resilient mounting elements of the engine and the generator are configured so that $1.2 < f_{gen\_vert}/f_{eng\_vert} < 30$, where $f_{gen\_vert}$ is the natural frequency of vertical oscillations of a mass-spring system formed by the resilient mounting elements of the generator and the mass supported by the mounting elements, and $f_{eng\_vert}$ is the natural frequency of vertical oscillations of a mass-spring system formed by the resilient mounting elements of the engine and the mass supported by the mounting elements. The ratio $f_{gen\_vert}/f_{eng\_vert}$ can be configured to be greater than 1.5 and/or smaller than 3.

According to an exemplary embodiment, the resilient mounting elements of the engine and the generator are configured so that $1.2 < f_{gen\_lat}/f_{eng\_lat} < 30$, where $f_{gen\_lat}$ is the natural frequency of lateral oscillations of a mass-spring system formed by the resilient mounting elements of the generator and the mass supported by the mounting elements, and $f_{eng\_lat}$ is the natural frequency of lateral oscillations of a mass-spring system formed by the resilient mounting elements of the engine and the mass supported by the mounting elements. The ratio $f_{gen\_lat}/f_{eng\_lat}$ can be configured to be greater than 1.5 and/or smaller than 3.

By configuring the resilient mounting elements of the engine and the generator so that the natural frequencies of the generator are higher than the natural frequencies of the engine, movements of the generator can be kept in acceptable ranges in short circuit or other transient situations. On the other hand, resilient mounting that is not too stiff reduces transmission of vibrations from the generator to the support surface.

According to an exemplary embodiment, the resilient mounting elements of the engine are configured so that $0<f_{eng\_vert}<1.1*n$, where $f_{eng\_vert}$ is the natural frequency of vertical oscillations of a mass-spring system formed by the resilient mounting elements of the engine and the mass supported by the mounting elements, and n is the intended rotation frequency [1/s] of the engine when driving the generator coupled to a load.

According to an exemplary embodiment, the resilient mounting elements of the engine are configured so that $0<f_{eng\_lat}<1.1*n$, where $f_{eng\_lat}$ is the natural frequency of lateral oscillations of a mass-spring system formed by the resilient mounting elements of the engine and the mass supported by the mounting elements, and n is the intended rotation frequency [1/s] of the engine when driving the generator coupled to a load.

According to an exemplary embodiment, the resilient mounting elements of the generator are configured so that $0.3<f_{gen\_vert}<3*n$, where $f_{gen\_vert}$ is the natural frequency of vertical oscillations of a mass-spring system formed by the resilient mounting elements of the generator and the mass supported by the mounting elements, and n is the intended rotation frequency [1/s] of the engine when driving the generator coupled to a load.

According to an exemplary embodiment, the resilient mounting elements of the generator are configured so that $0.3<f_{gen\_lat}<3*n$, where $f_{gen\_lat}$ is the natural frequency of lateral oscillations of a mass-spring system formed by the resilient mounting elements of the generator and the mass supported by the mounting elements, and n is the intended rotation frequency [1/s] of the engine when driving the generator coupled to a load.

According to an exemplary embodiment, the engine-generator set can include an inertia mass element that is arranged between the flexible coupling and the generator.

According to an exemplary embodiment, the engine-generator set can include a clutch that is arranged between the engine and the generator and configured to allow decoupling of the generator from the engine, and the generator is configured to allow function as a synchronous condenser.

In FIG. 1 is shown an exemplary engine-generator set (hereinafter also genset) according to an embodiment of the present disclosure. The genset includes a generator 2, which can be used for producing electricity. An internal combustion engine 1 is coupled to the generator 2 for driving the generator 2. The engine 1 is a large piston engine having a cylinder bore of at least 150 mm and/or rated power of at least 150 kW/cylinder. The engine-generator set can be used, for instance, as a reserve power source, at a power plant for supplying power to an electrical network, or in a ship for producing electricity for a propulsion system of the ship or for an electrical network of the ship.

The generator 2 can include a body 12 and a shaft 3, which is coupled to a crankshaft of the engine 1. The engine 1 can include a flywheel (not shown) that is attached to the crankshaft. The generator 2 is arranged at a flywheel end of the engine 1. The crankshaft of the engine 1 is arranged in parallel with the shaft 3 of the generator 2. The engine 1 and the generator 2 have a common rotation axis. The direction of the shaft 3 defines a longitudinal (or axial) direction of the genset. The generator 2 is coupled to the engine 1 by means of, for example, a flexible coupling 8. The flexible coupling 8 transmits torque from the engine 1 to the generator 2 but allows slight misalignment of the shaft 3 of the generator 2 and an output shaft of the engine 1. The flexible coupling 8 also reduces transmission of vibrations from the engine 1 to the generator 2. The flexible coupling 8 can include for instance rubber elements or similar elastic elements.

Each of the engine 1 and the generator 2 is supported against a support surface 5, such as a floor of a power plant or a hull of a ship. The support surface 5 is part of a rigid foundation, such as a reinforced concrete slab, other reinforced concrete structure or a steel structure. In the exemplary embodiments of the Figures, the engine 1 is arranged on a base frame 4, which is supported against the support surface 5. The term "base frame" refers here to a rigid, self-supporting platform, which is configured to carry the engine 1 arranged on its upper surface. The base frame 4 can be, for instance, a steel structure or a reinforced concrete block. The base frame 4 supports the engine 1 in the vertical direction. The engine 1 is attached rigidly to the base frame 4. There are thus no resilient mounting elements between the base frame 4 and the engine 1.

The base frame 4 is not arranged directly on the support surface 5, but a plurality of resilient mounting elements 6 are arranged between the base frame 4 and the support surface 5. The purpose of the resilient mounting elements 6 is to reduce transmission of vibrations from the engine 1 to the ground. It is not necessary to arrange the engine 1 on a base frame 4, but the engine 1 could also be supported against the support surface 5 directly via the resilient mounting elements 6. The engine 1 is thus supported via the resilient mounting elements 6 against the support surface 5 either directly or indirectly. In the embodiments of the Figures, the mounting elements are arranged below the engine 1.

In the exemplary embodiment of FIG. 1, also the generator 2 is arranged on a base frame 9. Also the base frame 9 of the generator 2 is a rigid, self-supporting platform, which is configured to carry the generator 2 arranged on its upper surface. The base frame 5 of the generator 2 can be, for instance, a steel structure or a reinforced concrete block. The base frame 9 of the generator 2 is separate from the base frame 4 of the engine 1. The generator 2 is attached rigidly to the base frame 9. The base frame 9 of the generator 9 is supported against the support surface 5 by means of, for example, a plurality of resilient mounting elements 7, which can be similar to the resilient mounting elements 6 of the engine 1. In the exemplary embodiment of FIG. 1, the support surface 5 is a continuous surface supporting both the engine 1 and the generator 2.

The engine 1 is in a mechanical connection with the generator 2 only via the flexible coupling 8. The base frames 4, 9 of the engine 1 and the generator 2 are not connected to each other. Vibrations can thus be transmitted from the engine 1 to the generator 2 solely via the flexible coupling 8 or via a path including the resilient mountings of both the engine 1 and the generator 2. Because there are resilient mounting elements 6, 7 both between the engine 1 and the support surface 5 and between the generator 2 and the support surface 5, transmission of vibrations from the engine 1 to the generator 2 is effectively prevented. Apart from the flexible coupling 8, vibrations from the engine 1 to the generator 2 can be transmitted only by passing first via the resilient mounting elements 6 of the engine 1, then via the support surface 5 and then via the resilient mounting elements 7 of the generator 2.

Figure 2:
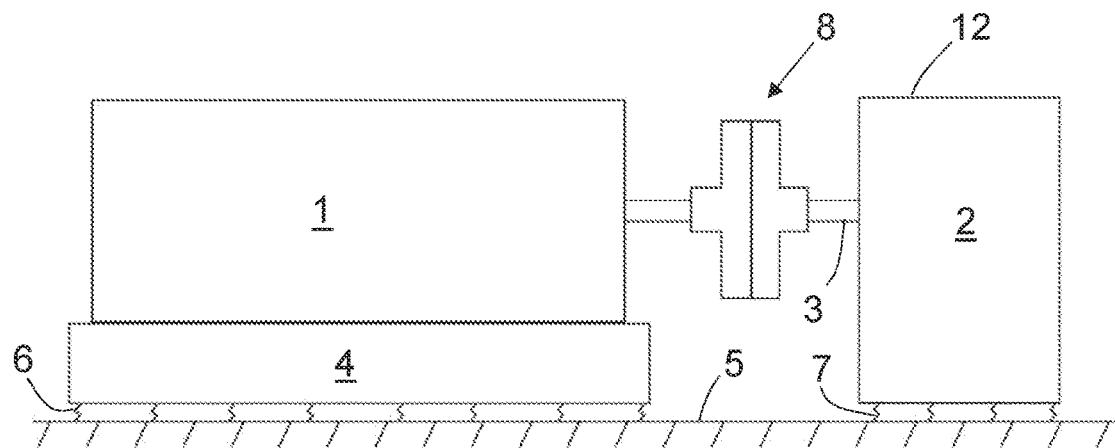
FIG. 2 shows an engine-generator set according to a second exemplary embodiment of the invention.

The exemplary embodiment of FIG. 2 is similar to the embodiment of FIG. 1. However, in the embodiment of FIG. 2, the generator 2 is not arranged on a base frame. Instead of a base frame, the body 12 of the generator 2 is supported against the support surface 5 directly via resilient mounting elements 7. In the exemplary embodiments of the Figures, the mounting elements 7 are arranged below the generator 2.

However, the generator 2 or a base frame could be provided with mounting brackets extending beyond the bottom of the generator 2 and at least part of the mounting elements 7 could be outside a horizontal projection of the generator 2.

Figure 3:
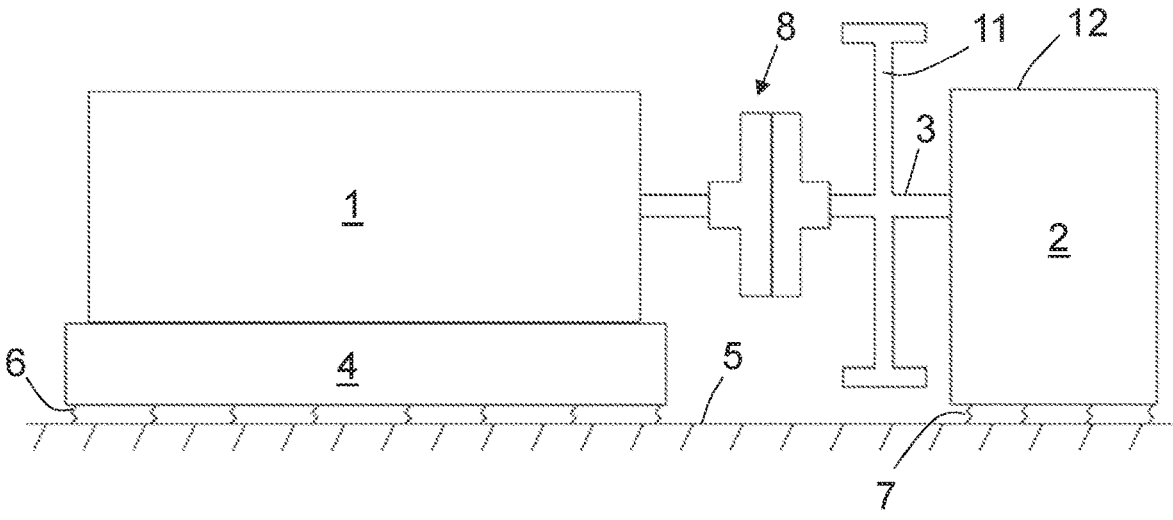
FIG. 3 shows an engine-generator set according to a third exemplary embodiment of the invention.

The exemplary embodiment of FIG. 3 is similar to the embodiment of FIG. 2. An additional feature of the embodiment of FIG. 3 is that an inertia mass element 11 is arranged between the flexible coupling 8 and the generator 2. The inertia mass element 11 is attached to the shaft 3 of the generator 2 in a rotationally fixed manner. The inertia mass element 11 thus rotates together with the rotor of the generator 2. The inertia mass element 11 is an assembly comprising one or more parts and being configured to have large inertia mass. The inertia mass element 11 increases the moment of inertia of the generator 2 and helps keeping the rotation speed of the generator 2 steady. Because the engine 1 and the generator 2 are not arranged on a common base frame, there is more room for a large diameter inertia mass element 11 between the engine 1 and the generator 2.

Figure 4:
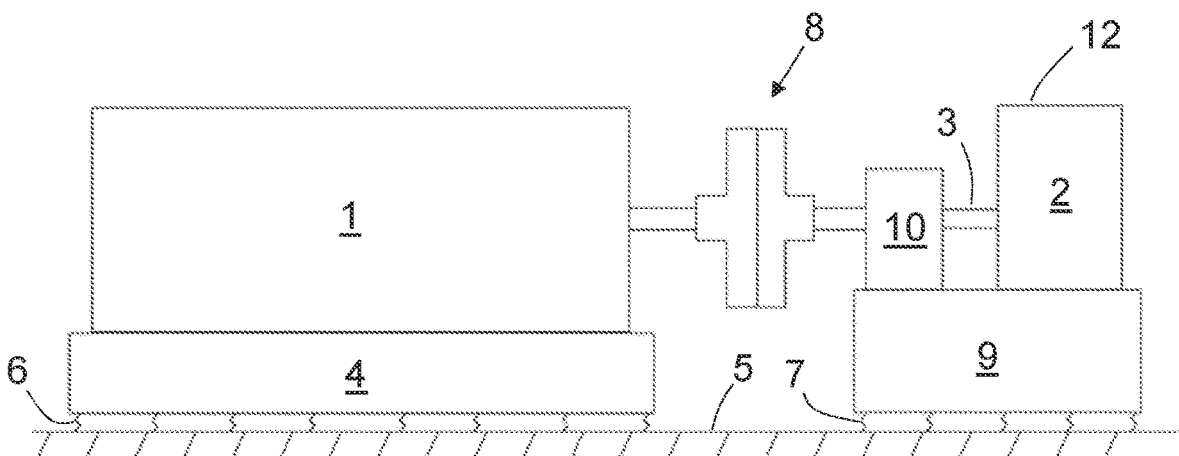
FIG. 4 shows an engine-generator set according to a fourth exemplary embodiment of the invention.

The exemplary embodiment of FIG. 4 is similar to the embodiment of FIG. 1. In the embodiment of FIG. 4, a clutch 10 is arranged between the engine 1 and the generator 2. The clutch 10 allows decoupling of the generator 2 from the engine 1. This allows the generator 2 to function as a synchronous condenser. Instead of a separate clutch, the clutch could be integrated to the generator 2. When the generator 2 functions as a synchronous condenser, it is not coupled to the engine 1 but the rotor of the generator 2 is allowed to rotate freely. The field voltage of the generator 2 is controlled to either generate or absorb reactive power. The generator 2 can thus be used for adjusting the voltage in a power grid to which it is connected or to improve power factor of the grid.

In the exemplary embodiments of the Figures, the engine 1 and the generator 2 are mechanically connected to each other solely via the flexible coupling 8. The engine 1 and the generator 2 are arranged on a common support surface 5, but each of the engine 1 and the generator is supported separately by means of, for example, its own resilient mounting elements 6, 7. Vibrations could be transmitted from the engine 1 to the generator only via both the mounting elements 6 of the engine 1 and the mounting elements 7 of the generator 2. Base frames 4, 9 of the engine 1 and the generator 2 are not connected to each other. Nor are the engine 1 and the generator 2 directly connected to each other apart from the flexible coupling 8. Instead of a common support surface 5, there could also be separate support surfaces below the engine 1 and the generator 2.

The resilient mounting elements 6, 7 of the engine 1 and the generator 2 are configured so that the support of the generator 2 is stiffer than the support of the engine 1. This reduces movements of the generator 2 for instance in short circuit or other transient situations. This reduces the risk of damages to wiring or other components of the genset. Each of the engine 1 and the generator 2 forms together with the respective mounting elements 6, 7 a mass-spring system, which has certain natural frequencies. The mass-spring systems can oscillate both in vertical and lateral directions and also in the longitudinal direction. In addition, the engine 1 and the generator 2 are subjected to yawing (rotation about vertical axis), pitching (rotation about lateral axis) and rolling (rotation about longitudinal axis) movements. The resilient mounting elements 6, 7 of the engine 1 and the generator 2 are configured so that at least in the vertical and lateral directions the natural frequencies of the mass-spring system of the generator 2 are greater than the natural frequencies of the mass-spring system of the engine 1.

The natural frequency of vertical oscillations of the mass-spring system formed by the resilient mounting elements 6 of the engine 1 and the mass supported by the mounting elements 6 can be marked as $f_{eng\_vert}$. The mass supported by the mounting elements 6 means the mass of the engine 1, the mass of a possible base frame 4 and the mass of any other components attached to the engine 1 or to the base frame 4. For instance, turbochargers attached to the engine 1 or arranged on the base frame 4 would form part of the mass-spring system. Similarly, the natural frequency of lateral oscillations of the mass-spring system formed by the mounting elements 6 and the engine 1 can be marked as $f_{eng\_lat}$.

The natural frequency of vertical oscillations of the mass-spring system formed by the resilient mounting elements 7 of the generator 2 and the mass supported by the mounting elements 7 can be marked as $f_{gen\_vert}$. The mass supported by the mounting elements 7 means the mass of the generator 2, the mass of a possible base frame 9 and the mass of any other components attached to the generator 2 or to the base frame 9. For instance, the mass of a clutch 10 or an inertia mass 11 would form part of the mass-spring system of the generator 2. Similarly, the natural frequency of lateral oscillations of the mass-spring system formed by the mounting elements 7 and the generator 2 can be marked as $f_{gen\_lat}$.

Suitable ratios for the natural frequencies are $1.2 < f_{gen\_vert}/f_{eng\_vert} < 30$ and $1.2 < f_{gen\_lat}/f_{eng\_lat} < 30$. When the ratios between the natural frequencies are within the above-mentioned ranges, the support of the generator 2 is stiffer than the support of the engine 1, although the generator 2 is still resiliently mounted and oscillations of the generator 2 are allowed. The ratios $f_{gen\_vert}/f_{eng\_vert}$ and $f_{gen\_lat}/f_{eng\_lat}$ can be chosen to be less than 3. With a lower ratio, less mounting elements 7 can be used to support the generator 2 and smaller forces are transmitted from the generator 2 to the support surface 5. A lighter foundation can thus be used for supporting the genset. With ratios $f_{gen\_vert}/f_{eng\_vert}$ and $f_{gen\_lat}/f_{eng\_lat}$ that are above 1.5, movements of the generator 2 in transient situations are further reduced.

The resilient mounting elements 6, 7 of the engine 1 and the generator 2 can be configured so that natural frequencies of the mass-spring systems of the engine 1 and the generator 2 are based on the rotation speed of the engine 1. The generator 2 is, for example, driven at a certain rotation speed, which produces electricity with a desired frequency, such as 50 Hz or 60 Hz. When the generator 2 is connected to a grid or to some other load, the engine 1 is thus operated at a certain intended rotation speed. For lateral oscillations, the natural frequency $f_{eng\_lat}$ can be in the range of 0-1.1*n, where n is the rotation frequency [1/s] of the engine 1, i.e. the rotation speed [rpm] divided by 60. For vertical oscillations, the natural frequency $f_{eng\_vert}$ can be in the range of 0-1.1*n. The natural frequency $f_{gen\_lat}$ of the lateral oscillations of the mass-spring system of the generator 2 can be configured to be in the range of 0.3-3*n, and the natural frequency $f_{gen\_vert}$ of the vertical oscillations can be configured to be in the range 0.3-3*n.

As an example, if the intended rotation speed of the engine 1 is 500 rpm, the natural frequencies could be $f_{eng\_lat} < 9.2$ Hz, $f_{eng\_vert} < 9.2$ Hz, $2.5 < f_{gen\_lat} < 25$ Hz, and $2.5$ Hz $< f_{eng\_vert} < 25$ Hz.

Natural frequencies of an undamped mass-spring system can be calculated by formula:

$$f = \frac{1}{2\pi}\sqrt{\frac{k}{m}}, \tag{1}$$

where f is a natural frequency of the mass-spring system, k is a spring coefficient of the spring and m is the mass supported by the spring. In the mass-spring system formed by the engine 1 and the resilient mounting elements 6, mass m would be the mass of the engine 1, possible base frame 4 and other components attached to the engine 1 or to the base frame 4. Spring coefficient k would be the total spring coefficient of the resilient mounting elements 6. Similarly, in the mass-spring system formed by the generator 2 and the resilient mounting elements 7, mass m would be the mass of the generator 2, possible base frame 9 and other components attached to the generator 2 or to the base frame 9. Spring coefficient k would be the total spring coefficient of the resilient mounting elements 7. The resilient mounting elements 6, 7 has a certain stiffness both in the vertical and lateral directions. Spring coefficients of the resilient mounting elements 6, 7 can thus be determined for both vertical and lateral directions.

From formula (1), it can be seen that as the mass of the engine 1 and the generator 2 are given, the natural frequencies of the mass-spring systems can be increased by using stiffer mounting elements 6, 7 and/or increasing the number of the mounting elements 6, 7.

The resilient mounting elements 6, 7 are, for example, configured so that the natural frequencies of the mass-spring systems of the engine 1 and the generator 2 are not equal to the frequencies of the excitations caused by the rotation of the engine 1 and the generator 2. For example, each natural frequency should differ from each excitation frequency by at least 1.0 percent. Excitation frequencies that should be taken into account in the configuration of the resilient mounting elements 6, 7 include integer multiples and half-order multiples of the rotation frequency of the engine 1. The rotation frequency refers here to the rotation frequency of the engine 1 when driving the generator 2 with an intended rotation speed. The natural frequencies should differ at least from order 0.5, order 1.0, order 1.5 and order 2.0 excitations. As an example, with an intended rotation speed of 500 rpm, i.e. with a rotation frequency of 8.33 Hz, the natural frequencies of the mass-spring systems of the engine 1 and the generator 2 should not coincide with frequencies 4.17, 8.33, 12.50 and 16.67 Hz.

In addition to the vertical and lateral oscillations, also longitudinal, yawing, pitching and/or rolling oscillations can be taken into account in the configuration of the resilient mounting elements 6, 7. For example, the resilient mounting elements 6, 7 are thus configured so that the natural frequencies of those oscillations do not coincide with the excitation frequencies.

Many different types of resilient mounting elements 6, 7 can be used for supporting the engine 1 and the generator 2. For instance, the mounting elements can be based on coil springs. Each resilient mounting element 6, 7 can include one or more coil springs. Alternatively, each resilient mounting element 6, 7 could include one or more rubber elements or elements made of a similar elastic material. In addition to the resilient mounting elements 6, 7, dampers can be arranged between the support surface 5 and the engine 1 and/or the generator 2. The dampers can be configured to damp the oscillations of the engine 1 and/or the generator 2. The dampers can be integrated to the resilient mounting elements 6, 7. The mounting elements 6, 7 can thus be configured to damp the oscillations.

It will be appreciated by a person skilled in the art that the invention is not limited to the embodiments described herein, but may vary within the scope of the appended claims. For instance, also in the exemplary embodiments of FIGS. 1 and 4, an inertia mass element could be arranged between the engine and the generator and the gensets of FIGS. 2 and 3 could be provided with a clutch for allowing the generator to function as a synchronous condenser.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. An engine-generator set comprising:
a generator for producing electricity; and
an engine that is coupled via a flexible coupling to a shaft of the generator for driving the generator, wherein the engine is supported against a support surface by a plurality of resilient mounting elements, and the generator is supported against a support surface by a plurality of resilient mounting elements separately from the engine, wherein the engine is mechanically connected to the generator solely via the flexible coupling;
wherein the resilient mounting elements of the engine and the generator are configured so that $1.2 < f_{gen\_vert} / f_{eng\_vert} < 30$, where $f_{gen\_vert}$ is a natural frequency of vertical oscillations of a mass-spring system formed by the resilient mounting elements of the generator and a mass supported by said resilient mounting elements, and $f_{eng\_vert}$ is a natural frequency of vertical oscillations of a mass-spring system formed by the resilient mounting elements of the engine and a mass supported by said resilient mounting elements.

2. The engine-generator set according to claim 1, wherein the engine is arranged on a base frame and the resilient mounting elements of the engine are arranged between the base frame and the support surface.

3. An engine-generator set according to claim 2, wherein the generator is arranged on a base frame that is separate from the base frame of the engine, and the resilient mounting elements of the generator are arranged between the base frame and the support surface.

4. An engine-generator set according to claim 3, wherein the resilient mounting elements of the engine and the generator are configured so that $1.2 < fgen\_vert / feng\_vert < 30$, where fgen_vert is a natural frequency of vertical oscillations of a mass-spring system formed by the resilient mounting elements of the generator and a mass supported by said mounting elements, and feng_vert is a natural frequency of vertical oscillations of a mass-spring system formed by the resilient mounting elements of the engine and a mass supported by said mounting elements.

5. The engine-generator set according to claim 1, wherein the generator is arranged on a first base frame that is separate from a second base frame, and the resilient mounting elements of the generator are arranged between the first base frame and the support surface.

6. The engine-generator set according to claim 1, wherein $1.5 < f_{gen\_vert} / f_{eng\_vert}$.

7. An engine-generator set according to claim 6, wherein fgen_vert/feng_vert<3.

8. The engine-generator set according to claim 1, wherein $f_{gen\_vert} / f_{eng\_vert} < 3$.

9. The engine-generator set according to claim 1, wherein the resilient mounting elements of the engine and the generator are configured so that $1.2 < f_{gen\_lat}/f_{eng\_lat} < 30$, where $f_{gen\_lat}$ is a natural frequency of lateral oscillations of a mass-spring system formed by the resilient mounting elements of the generator and a mass supported by said resilient mounting elements, and $f_{eng\_lat}$ is a natural frequency of lateral oscillations of a mass-spring system formed by the resilient mounting elements of the engine and a mass supported by said resilient mounting elements.

10. The engine-generator set according to claim 9, wherein $1.5 < f_{gen\_lat}/f_{eng\_lat}$.

11. The engine-generator set according to claim 9, wherein $f_{gen\_lat}/f_{eng\_lat} < 3$.

12. The engine-generator set according to claim 1, wherein the resilient mounting elements of the engine are configured so that (0 oscillations per time t)$< f_{eng\_vert}$ (<1.1*n oscillations per time t), where $f_{eng\_vert}$ is a natural frequency of vertical oscillations of a mass-spring system formed by the resilient mounting elements of the engine and a mass supported by said resilient mounting elements, and n is an intended rotation frequency [1/s] of the engine when driving the generator coupled to a load.

13. An engine-generator set according to claim 12, wherein the resilient mounting elements of the engine are configured so that 0<feng_lat<1.1*n, where feng_lat is a natural frequency of lateral oscillations of a mass-spring system formed by the resilient mounting elements of the engine and a mass supported by said mounting elements, and n is an intended rotation frequency [1/s] of the engine when driving the generator coupled to a load.

14. The engine-generator set according to claim 1, wherein the resilient mounting elements of the engine are configured so that (0 oscillations per time t)$< f_{eng\_lat} < (1.1*n$ oscillations per time t), where $f_{eng\_lat}$ is a natural frequency of lateral oscillations of a mass-spring system formed by the resilient mounting elements of the engine and a mass supported by said resilient mounting elements, and n is an intended rotation frequency [1/s] of the engine when driving the generator coupled to a load.

15. The engine-generator set according to claim 1, wherein the resilient mounting elements of the generator are configured so that (0.3 oscillations per time t)$< f_{gen\_vert} < (3*n$ oscillations per time t), where $f_{gen\_vert}$ is a natural frequency of vertical oscillations of a mass-spring system formed by the resilient mounting elements of the generator and a mass supported by said resilient mounting elements, and n is an intended rotation frequency [1/s] of the engine when driving the generator coupled to a load.

16. The engine-generator set according to claim 1, wherein the resilient mounting elements of the generator are configured so that (0.3 oscillations per time t)$< f_{gen\_lat} < (3*n$ oscillations per time t), where $f_{gen\_lat}$ is a natural frequency of lateral oscillations of a mass-spring system formed by the resilient mounting elements of the generator and a mass supported by said resilient mounting elements, and n is an intended rotation frequency [1/s] of the engine when driving the generator coupled to a load.

17. An engine-generator set according to claim 1, wherein the engine-generator set comprises:

an inertia mass element that is arranged between the flexible coupling and the generator.

18. An engine-generator set according to claim 1, wherein the engine-generator set comprises:

a clutch that is arranged between the engine and the generator and configured to allow decoupling of the generator from the engine, and the generator is configured to allow function as a synchronous condenser.

19. An engine-generator set according to claim 1, wherein the resilient mounting elements of the engine and the generator are configured so that 1.2<fgen_lat/feng_lat<30, where fgen_lat is a natural frequency of lateral oscillations of a mass-spring system formed by the resilient mounting elements of the generator and a mass supported by said mounting elements, and feng_lat is a natural frequency of lateral oscillations of a mass-spring system formed by the resilient mounting elements of the engine and a mass supported by said mounting elements.

\* \* \* \* \*